United States Patent [19]

Watras

[11] Patent Number: 5,447,760

[45] Date of Patent: Sep. 5, 1995

[54] SIMULATED CRACKED GLASS MIRROR TILE AND METHOD

[76] Inventor: Edward W. Watras, 13 Monfront Dr., Huntington, N.Y. 11743

[21] Appl. No.: 222,706

[22] Filed: Apr. 4, 1994

[51] Int. Cl.⁶ .............................................. B32B 3/00
[52] U.S. Cl. ...................................... 428/13; 428/15; 428/46; 428/49; 428/912.2; 156/60
[58] Field of Search .............. 428/912.2, 46, 49, 15, 428/13; 156/60

[56] References Cited

U.S. PATENT DOCUMENTS

| | | | |
|---|---|---|---|
| 3,119,371 | 1/1964 | Zuckerman | 428/912.2 |
| 3,775,153 | 11/1973 | Greenberg et al. | 428/912.2 |
| 4,990,407 | 2/1991 | Watras | 428/426 |
| 5,277,952 | 1/1994 | Watras | 428/46 |

Primary Examiner—Alexander S. Thomas
Attorney, Agent, or Firm—Stoll, Miskin, Previto & Hoffman

[57] ABSTRACT

Construction and method of making a simulated decorative cracked glass laminate in tile, panel, sheet, plate or veneer form. The structural element comprises in bonded combination a glass mirror and a backing layer, preferably a water-felted mineral fiberboard panel. An accurately reproduced image of decorative cracked glass is applied to the mirror, either before or after the mirror is bonded to the backing layer to provide a simulated decorative cracked glass mirror appearance with the mirror being uncracked and intact and the bonded combination being shatter-, heat- and fire-resistant. Means are provided to produce such a simulated cracked glass appearance with uncracked glass.

11 Claims, 3 Drawing Sheets

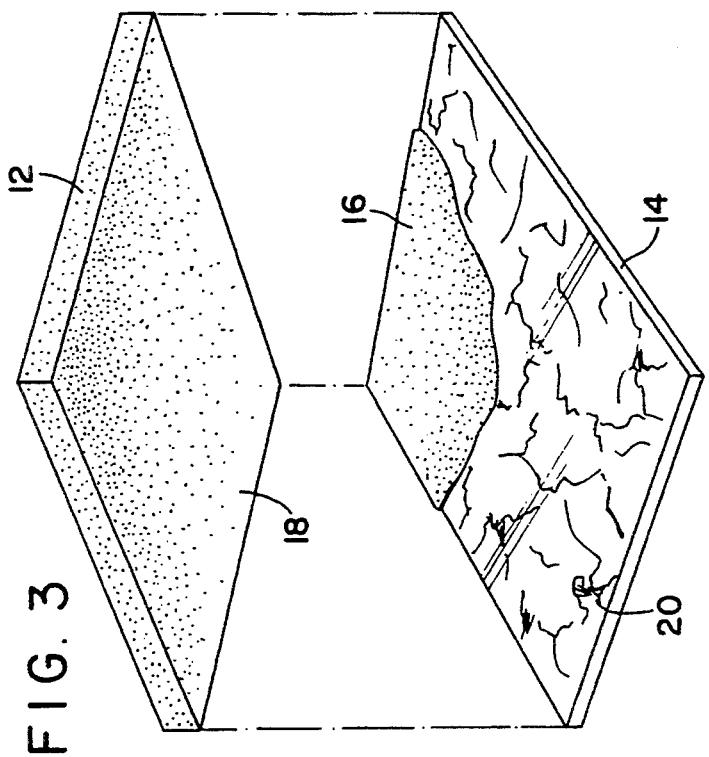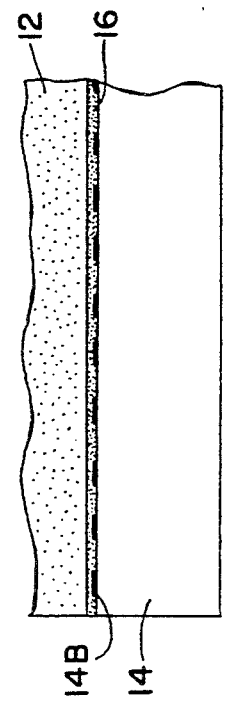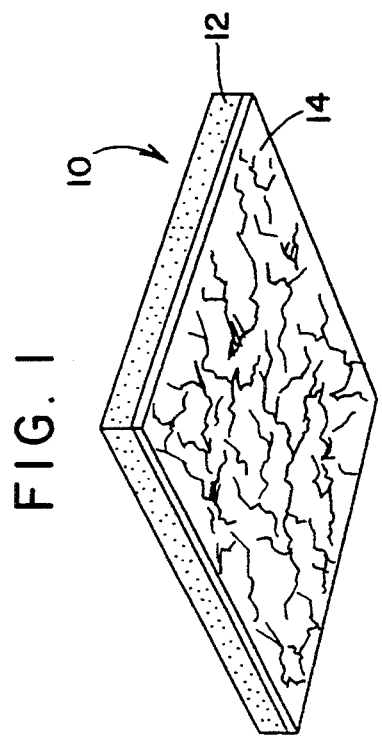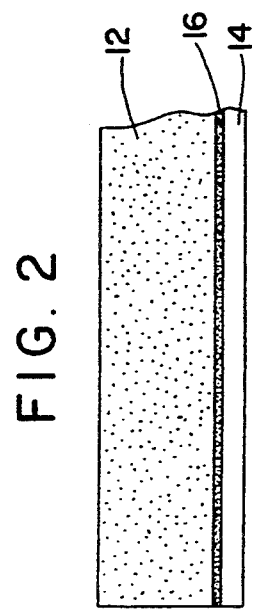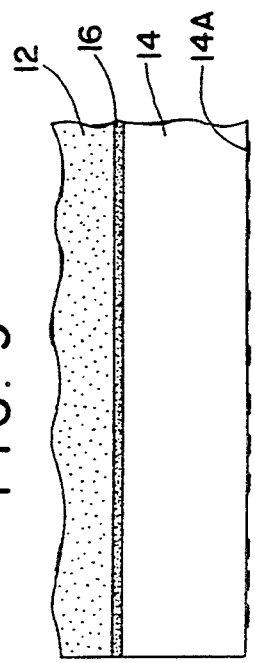

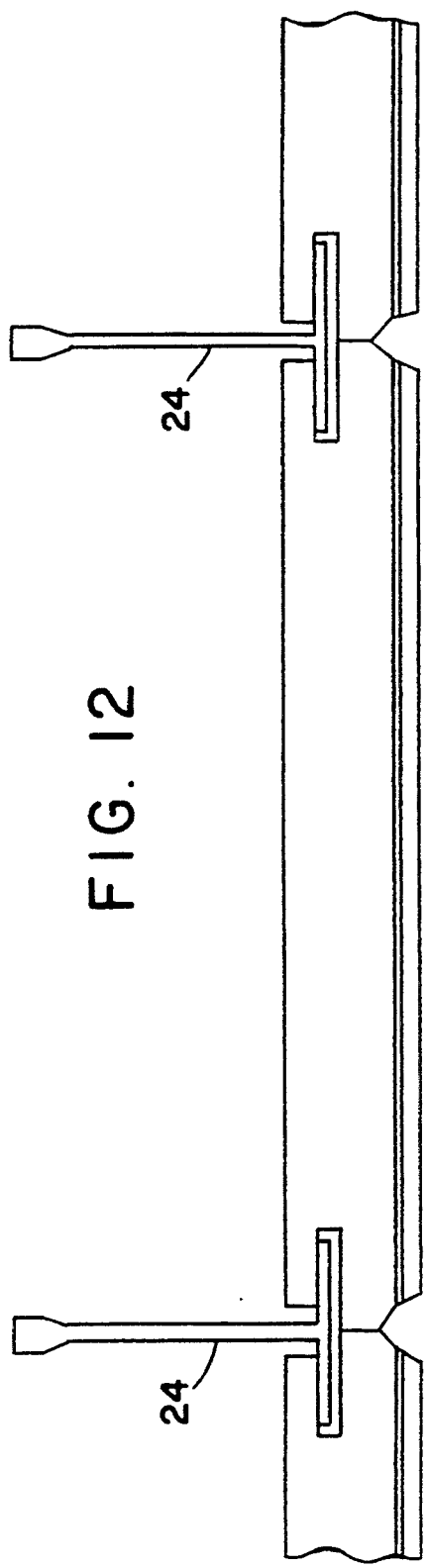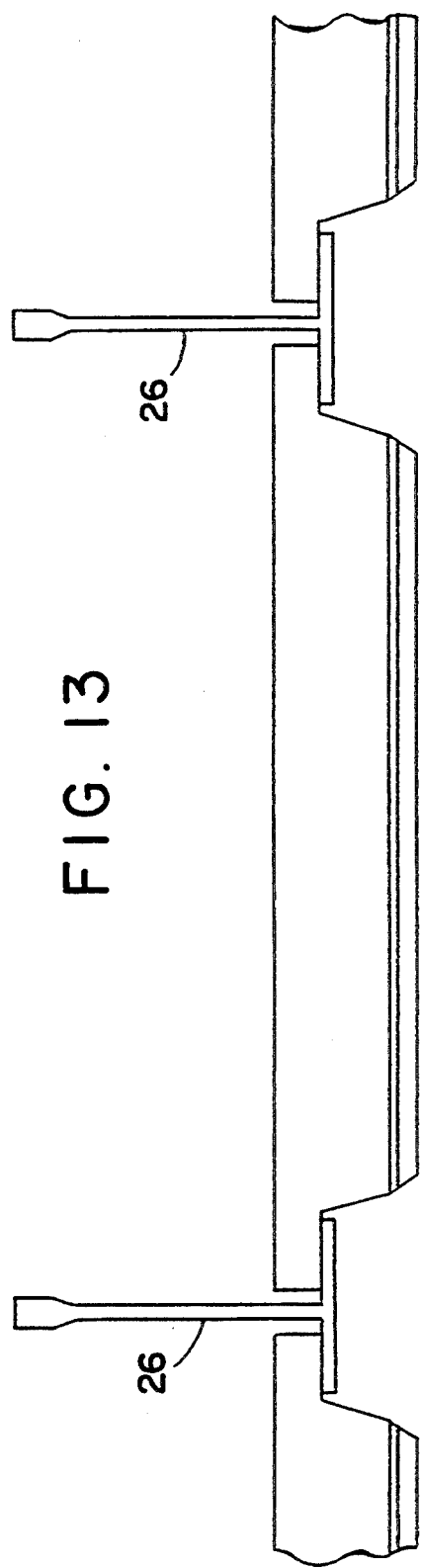

SIMULATED CRACKED GLASS MIRROR TILE AND METHOD

REFERENCE TO RELATED DOCUMENTS

Reference is made to my U.S. Pat. No. 4,990,407, issued Feb. 5, 1991, and to Disclosure Document No. 197,611, filed Jul. 26, 1988 in connection therewith. Reference is also made to my U.S. Pat. No. 5,277,952, issued Jan. 11, 1994. Reference is further made to Disclosure Document No. 346,854, filed Jan. 19, 1994 in connection herewith.

BACKGROUND OF THE INVENTION

Mirrored ceiling and wall surfaces are decoratively appealing, but prior to my U.S. Pat. No. 4,990,407 ('407) they presented structural and construction problems. As noted in that patent, if the mirror is to be glass, as is generally preferred, weight is a significant disadvantage, particularly in ceilings where it is difficult to handle large glass panels during installation and difficult to provide adequate structural support. Smaller glass mirrors, in the form or size of tiles, reduce the weight problem of each individual piece, but at least two significant problems remain. First, glass mirrors are not good acoustical absorbers, and therefore yield higher than necessary sound levels where used. Second, glass mirrors generally crack under heat and heretofore have been unacceptable where fire-resistant construction is desirable.

Another important objective of my '407 patent is personal safety. Conventional glass mirror installed in direct hung gridwork presents a possible safety hazard if impacted by a mop frame or other implement. In glass industry usage, a shatter-resistant mirror is the term used when a vinyl or other supporting sheet is adhesively secured to the back surface of a mirror, but such a structure helps to prevent shards of glass from falling from the mirror more than preventing the glass from shattering.

The overriding purpose of a mirror tile is decorative and my invention in my '407 patent made mirror tiles constructed of glass safe and practical. As commercially sold under the names Image-Safe ®, Tru-Mirror ®, and Island Reflections ™, trademarks of Inter-County Building Materials Corp. of Deer Park, Long Island, N.Y., such tiles have been approved under building codes and have received Underwriters Laboratories Inc. (U.L. ®) approval.

Notwithstanding the purpose of my prior invention to make glass tiles safer (resisting breakage but if accidentally broken, the glass fragments remain in place), there is decorative purpose in having glass mirror tiles which are intentionally cracked. There is great visual beauty in a well-silvered glass mirror which is intentionally cracked or crazed throughout. My U.S. Pat. No. 5,277,952 ('952) provides a structure and method of making such tiles, and providing them with adequate protection when installed.

The invention of my '952 patent has a broader use than the specific purpose above described. In its broad principle, the invention provides a decorative cracked glass laminate in various forms such as tiles, panels, sheets, plates, veneers and in situ applications. The intermediate layer of the laminate is a sheet of tempered glass mirror. This intermediate layer is laminated between a supportive or protective backing such as a fiberboard panel, and an outer (front) transparent sheet, e.g., a sheet of annealed glass. The intermediate tempered glass mirror is caused to crack from edge to edge by cutting into one edge, as by a rotating diamond-tipped blade. The resulting laminate has actually cracked glass sealed behind an intact glass front and may be used as a ceiling tile, a floor tile, a wall decoration, a table or counter top, and various other applications.

The invention of my '952 patent accordingly provides a mirror construction which combines the visual advantages of an intentionally cracked glass mirror (distortionless reflected images, high resistance to discoloration due to aging or exposure to light or atmospheric attack) with none of the safety disadvantages of a conventional installation of glass and with high degrees of fire-resistance and acoustical absorption, in sizes and shapes adopted for ease of shipping, handling and installation. However, adhesives used to bond the outer glass cover to the glass mirror are limited in that they must be transparent to permit the cracked glass mirror image to be clearly seen without loss of clarity, both initially and over time and exposure. Included among Transparent adhesives disclosed in my '952 patent are those made of polyvinylbuterol (PVB). There are circumstances in which use of PVB adhesives are restricted or are undesirable.

SUMMARY OF THE INVENTION

The present invention provides the full decorative appearance and desirability of a cracked glass mirror without the need to crack the glass in the final product, or, if cracked, to seal the cracked glass layer behind an uncracked glass cover sheet.

The present invention provides the bonded combination of a mineral fiberboard backing with a cracked glass appearing glass mirror, in which the glass mirror is in fact intact, by applying an accurately reproduced image of decorative cracked glass to the glass mirror.

A single layer of silvered mirror-glass, bonded to a mineral-composition backing as disclosed in my '407 patent, provides a shatter-, heat-, and fire-resistant combination as described therein. A photograph is made of the original cracked-glass laminate referred to above and is converted into a silk-screen printing element, sheet or roll, embodying the cracked-glass design. The silk screen is used to print or etch the cracked-glass design on a surface of the mirror-glass, yielding an accurate, visually pleasing image of the cracked-glass laminate, without the cracked glass itself.

BRIEF DESCRIPTION OF THE DRAWINGS

FIG. 1 is a perspective view of a simulated cracked glass ceiling tile of the present invention.

FIG. 2 is an enlarged fragmentary side view of the simulated cracked glass ceiling tile of the present invention.

FIG. 3 is an exploded view of the simulated cracked glass ceiling tile structural element of the present invention.

FIG. 5 shows in assembly view an image-bearing screen and the uncracked glass mirror. FIG. 6 shows in edge view the mask as placed on a face of the uncracked glass mirror. FIG. 7 shows the combination of FIG. 6 immersed in an acid bath. FIG. 8 shows in edge view the image etched into the surface of an uncracked glass mirror.

FIG. 9 is an enlarged fragmentary side view of the simulated cracked glass ceiling tile of the present invention showing an exposed image surface.

FIG. 10 is a view similar to that of FIG. 9 but shown an unexposed or sealed image baring surface.

FIG. 12 is a view of the simulated cracked glass ceiling tile of the invention supported on hidden hung gridwork.

FIG. 13 is a view of the simulated cracked glass ceiling tile of the invention supported on recessed hung gridwork.

DESCRIPTION OF A PREFERRED EMBODIMENT

Figure 4:
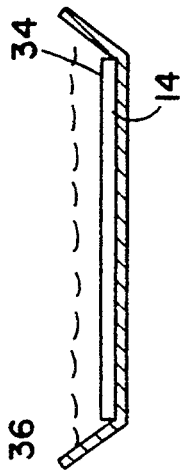
FIG. 4 is schematic view of the photographic taking of the image of actual cracked glass mirror.
Figure 5:
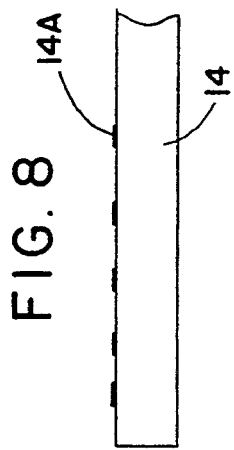
FIG. 5–8 sequentially show an acid etch method for applying the image of an actual cracked glass mirror to an uncracked glass mirror.
Figure 6:
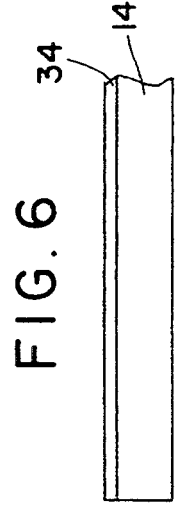
Figures 7, 8:
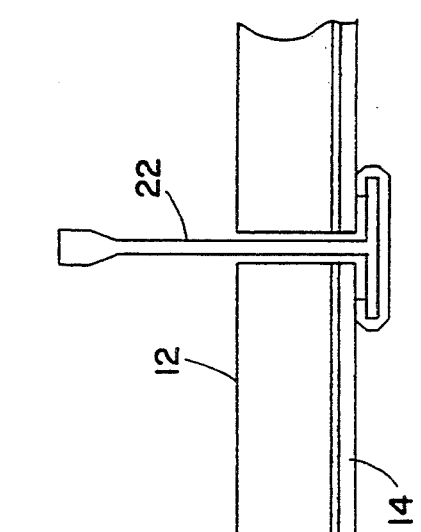

Referring to the drawing, the ceiling tile composite 10 of the present invention is a decorative structural element comprising in bonded combination shock and heat retardant means 12, which for ceiling tile use is preferably mineral fiberboard, decorative reflective means 14 and bonding means 16, preferably an adhesive, therebetween.

As indicated in my prior patents, mineral fiberboard 12 is preferably a water felted mineral composition acoustical ceiling panel having specific characteristics of at least one substantially planar but fissured surface 18, a minimum density of approximately one pound per square foot of area covered in order to comply with Underwriters Laboratories Inc. (U.L. Labs) classified acoustical material time design fire tests, and compliance with other fire ratings. The fissures on or in said surface 18 are preferably uniform and non-directional.

Acceptable commercially-available mineral fiberboards for use with the present invention are USG Auratone TM Firecode TM panels in Omni-Fissured pattern (United States Gypsum Company, Chicago, Ill.), Armstrong Minaboard TM FireGuard panels, Cortega pattern (Armstrong World Industries, Inc., Lancaster, Pa.) and Celotex TM Hytone ® Protectone TM panels, Mosaic or ND Fissuretone patterns (Celotex Building Products Division, The Celotex Corporation, Tampa, Fla.).

Decorative reflective means 14 preferably comprises a glass mirror of double-thick decorative glass having a nominal thickness of ⅛ inch. Other thicknesses, or color-tinted glass, may be used depending on availability, application and desired decorative effect. Glass itself is non-combustible. In accordance with the present invention, the glass of glass mirror layer 14A is tempered, preferably full tempered and not just heat strengthened, as generally understood in the glass industry.

As indicated in my prior patents, bonding means 16 comprises an adhesive, preferably a rubber- or latex-base epoxy waterproof composition, which is non-flammable when fully cured and which is adapted for mirror use so as to be non-degradable with respect to the silvered or reflective side of the mirror. Suitable commercially available rubber base adhesives are Sta-Stuck ® Mirror Bond, Specialty Chemicals Company, Division of Continental Chemical and Coatings Corporation, Woburn, Mass., and Ultra/Bond ® Mirror Mastic, C. Gunther Company, Cary, Ill. Suitable latex base adhesives are Henry TM #430 non-flammable clear Thin-Spread adhesive, The W. W. Henry Company, Huntington Park, Calif., and Miracle TM clear set #420 floor tile adhesive, Miracle Adhesives Corporation, Bellmore, Long Island, N.Y. A suitable epoxy-adhesive is Poly-Com Bond 2, a two-component epoxy structural adhesive available in liquid form (advantageous for high volume production) and in gel form (for trowel-spread low volume use) from Polymer Compounds, Hauppauge, Long Island, N.Y.

Rubber base adhesives are gun (cartridge) grade, and are suitable for low volume production. The application of this type of adhesive must follow a prescribed repeat pattern with a specific amount per course. Latex base adhesives are brush or roller grade, and are suitable for high volume production. Using a textured paint roller makes the application of the adhesive extremely easy, and the quantity of adhesive is not as critical.

Adhesive 16, when appropriately applied to bond mirror 14 to mineral fiberboard substrate 12, enters the fissures of fissured surface 18 of substrate 12 during application, curing or both. The strength of the resulting bond is thereby enhanced by reason of the increased surface area of substrate 12 to which adhesive 16 attaches. Moreover, substantially to the extent that adhesive 16 fills in what would otherwise be a void formed by a fissure against mirror 14, there is also greater bonded surface area on the bonded side 20 of mirror 14.

The method of the present invention is to create an image, in reproduceable form, of decorative cracked glass mirror 30 as created, for example, by the method described in my '952 patent, which method is incorporated herein by reference. The image, therefore, is of actual cracked glass mirror 30 and may be created by such imaging process, such as color photography or color xerography, as will yield a visually accurate and therefore decoratively appealing replica of actual cracked glass. Photographic image taking of actual cracked glass 30 by camera 32 is shown in FIG. 4. Such image is thereafter applied by such application process, such as photographic printing, screen or roller printing or etching, to glass mirror 14 or to a prepared surface thereon, such as a photo-emulsion or a specially cleaned or treated surface, to produce a permanent and accurate reproduction of cracked glass on glass mirror 14.

An example of an acid etch method is shown in FIGS. 5-8 in which a screen or mask 34, prepared as a photo-image of actual cracked glass 30, is applied to the face of glass mirror 14, and the combination placed in an acid bath 36. Mask 34 selectively permits or prohibits the acid from contacting the surface of glass mirror 14 in accordance with the pattern of the photo-image of actual cracked glass 30 on the mask. The acid accordingly etches that image 14A of actual cracked glass 30 onto the surface of glass mirror 14 as shown in edge view in FIG. 8. An example of a preferred acid etch is Super Blue Screen Etch from McKay International of Brooklyn, N.Y.

If it is desired to protect the image from deleterious effects, such as abrasion, salt spray or sea air, a glass cover layer may be adhesively laminated to image-bearing glass mirror 14 by means described in my '952 patent. Alternatively, and to avoid the use of PVB adhesive for laminating the glass layers together, the image may be applied to the inside surface 14B of the glass which is thereafter silvered to form glass mirror 14.

It has been found that photographing actual cracked glass mirror 14 presents a problem of spurious reflections from the mirror. A white screen 36 with a hole 38 at camera lens 40 as shown in FIG. 4 has been found to be useful as a shield against such spurious reflections while permitting the full image of a cracked glass mirror to be photographed in all its visual depth.

When installed as a suspended ceiling tile element, ceiling tile composite 10 is intended to be supported by a suspension system having direct hung gridwork 22 of inverted T exposed double web design, such as shown in FIG. 4 of my '407 patent, having, as a minimum, ASTM classification for intermediate duty. As noted in my prior patents, when so supported ceiling tile composite 10 is in compression rather than in tension, aiding the permanence of the bond of adhesive 16.

Figure 11:
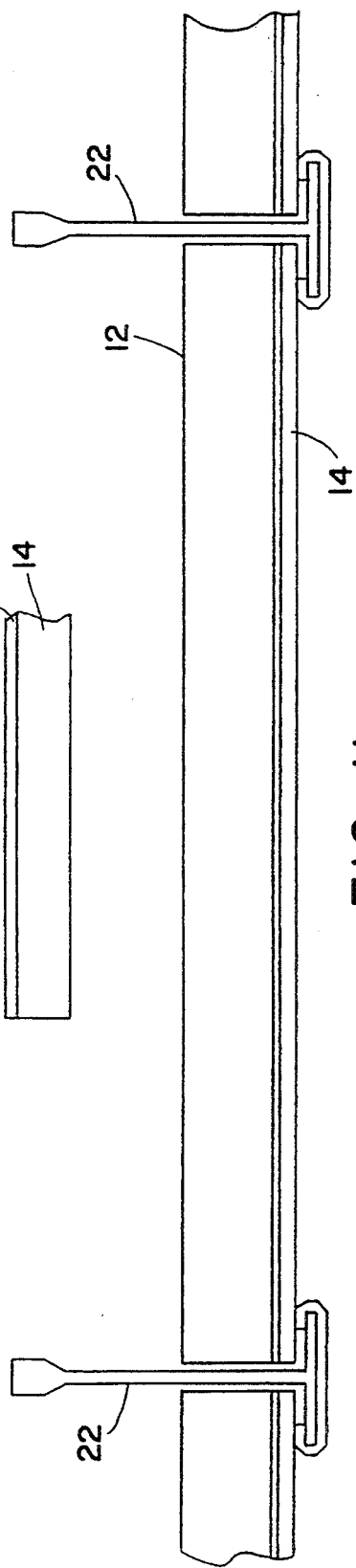
FIG. 11 is a view of the simulated cracked glass ceiling tile of the invention supported on exposed hung gridwork.

It has been found, however, that the bond of adhesive 16 is strong enough to support the weight of decorative means 14, even though the bond is in tension. This makes available use of concealed gridwork 24 as shown in FIG. 10 of my '952 patent, and recessed gridwork 26 as shown in FIG. 11 thereof, both having decorative differences and advantages over the exposed gridwork 22 of FIG. 4 thereof.

Ceiling tile composite 10 of the present invention accordingly provides long-lasting scratch-resistant decorative beauty of cracked glass mirror ceilings and walls with structural and fire-retardant properties, without unnecessary or undesirable adhesives, and without the final product itself being made of cracked glass.

In typical dimension, ¾-inch thick and nominal 2 feet by 2 feet or 2 feet by 4 feet panels (actual 23¾ inches X 23¾ inches and 23¾ inches X 47¾ inches, respectively), ceiling tile composite 10 constructed and suspended as aforesaid is intended to comply with current Underwriters Laboratories Inc. classified acoustical material time design fire tests.

What is claimed is:

1. A decorative laminate, comprising:
   a. a glass mirror,
   b. a backing sheet, said backing sheet being bonded to said glass mirror, said backing sheet comprising a shock and heat retardant mineral fiberboard, and
   c. image means, said image means being affixed to said glass mirror, said image means comprising the image of cracked glass.

2. A decorative laminate in accordance with claim 1, wherein said image means is located in lamination means between said glass mirror and said backing sheet.

3. A decorative laminate in accordance with claim 1, wherein said image means is affixed to the face of said glass mirror.

4. A decorative laminate in accordance with claim 1, wherein said image means is affixed to the inside surface of the glass of said glass mirror.

5. A decorative laminate in accordance with claim 1, additionally comprising front light-transmitting means, said front light-transmitting means comprising cover means over said image means.

6. A decorative laminate in accordance with claim 1, additionally comprising suspension means, said suspension means comprising gridwork means comprising laminate supporting web means, said decorative laminate being supported by said laminate supporting web means.

7. A decorative laminate in accordance with claim 6, said backing sheet having at least one recess to receive at least a portion of said laminate supporting web means.

8. A decorative laminate in accordance with claim 6, said backing sheet having at least one recess to receive at least a portion of said laminate supporting web means, the edges of each said decorative laminate being chamfered.

9. A decorative laminate in accordance with claim 6, said backing sheet having at least one recess to receive at least a portion of said laminate supporting web means, the edges of each said decorative laminate being chamfered sufficiently to expose at least a portion of said laminate supporting web means to view.

10. A ceiling tile composite, comprising
    a. glass mirror means and mineral fiberboard backing means laminated thereto,
    b. suspension means, said suspension means comprising gridwork means comprising ceiling tile composite supporting web means,
    c. said fiberboard backing means having at least one recess to receive at least a portion of said supporting web means,
    d. the edges of said glass mirror means being chamfered, and
    e. image means, said image means being in permanent visible association with said glass mirror means, whereby the image of said image means is visible both directly and as a reflected image.

11. A ceiling tile composite in accordance with claim 10, wherein said image means comprises the image of cracked glass.

* * * * *